(12) United States Patent
Fujioka

(10) Patent No.: US 6,435,656 B2
(45) Date of Patent: Aug. 20, 2002

(54) RECORDING DEVICE

(75) Inventor: Satoshi Fujioka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/910,829

(22) Filed: Jul. 24, 2001

(30) Foreign Application Priority Data

Jul. 27, 2000 (JP) ........................................ 2000-226227
Jul. 23, 2001 (JP) ........................................ 2001-220944

(51) Int. Cl.$^7$ .................................................. B41J 2/21
(52) U.S. Cl. .............................. 347/43; 347/41; 347/15
(58) Field of Search ............................. 347/43, 15, 12, 347/40, 41, 16

(56) References Cited

U.S. PATENT DOCUMENTS

| | | | |
|---|---|---|---|
| 4,063,254 A | 12/1977 | Fox et al. ...................... | 347/41 |
| 4,198,642 A | 4/1980 | Gamblin ....................... | 347/41 |
| 6,302,517 B1 * | 10/2001 | Kanaya ........................ | 347/41 |
| 6,328,406 B1 * | 12/2001 | Takahashi ..................... | 347/15 |
| 6,328,419 B2 * | 12/2001 | Otsuki ......................... | 347/41 |

FOREIGN PATENT DOCUMENTS

| | | |
|---|---|---|
| EP | 0 795 838 | 9/1997 |
| EP | 0 864 429 | 9/1998 |
| EP | 0 978 387 | 2/2000 |
| JP | 53-2040 | 1/1978 |
| JP | 9-169109 | 6/1997 |

* cited by examiner

Primary Examiner—Lamson D. Nguyen
(74) Attorney, Agent, or Firm—Oblon, Spivak, McClelland, Maier & Neustadt, P.C.

(57) ABSTRACT

A total of 64 nozzles are arrayed in the secondary scanning operation in a surface of a recording head. The upstream nozzles #62 to #64 and the downstream nozzles #1 to #3 are disposed on the same primary scan line through four times of secondary scanning operations, thereby forming the overlapping raster. Nozzles #62 and #1 form dots in a ratio of 3 to 2 in number. Nozzles #63 and #2 form dots in a ratio of 1 to 1. Nozzles #64 and #1 form dots in a ratio of 1 to 3.

31 Claims, 7 Drawing Sheets

ARRANGEMENT OF NOZZLE ARRAYS

DOTS FORMED BY ONE NOZZLE ARRAY

RECORDING DEVICE

BACKGROUND OF THE INVENTION

1. Field of the Invention

The present invention relates to a recording device. More particularly, the invention relates to a recording device which has a recording head including an array consisting of an N (N =a positive integer) number of dot forming elements, which are arrayed at a fixed spatial interval D in a secondary scanning operation as a recording-medium feeding direction, a head drive means for driving dot forming elements, a primary scan drive means for reciprocatively moving the recording head relative to a recording medium in a primary scanning operation, which is orthogonal to the secondary scanning operation, and a secondary scan drive means for feeding a recording medium relative to the recording head in the secondary scanning operation, wherein the recording head records an image while scanning a surface of a recording medium in primary and secondary scanning operations.

The present application is based on Japanese Patent Applications No. 2000-226277 and 2001-220944, which are incorporated herein by reference.

2. Description of the Related Art

A typical example of the recording method for improving the print quality of the ink jet printer is disclosed in Unexamined Japanese Patent Publication No. Hei. 9-169109. This recording method is constructed by combining a partial overlapping method into an "interlacing method" described in U.S. Pat. No. 4,198,642 and Unexamined Japanese Patent Publication No. Sho. 53-2040. The "partial overlapping method" is a recording method in which a part of a raster is recorded by using different inkjet nozzles (referred to simply as "nozzles") through a plural number of primary scanning operations, and another part of the raster is recorded by using one nozzle through one primary scanning operation. In the specification description, the raster which is recorded by using different nozzles through a plural number of primary scanning operations, will be referred to as an "overlapping raster", and the raster which is recorded by using one nozzle through one primary scanning operation, will be referred to as a "non-overlapping raster".

In the overlapping raster, a plurality of nozzles used for raster formation are intermittently driven to eject ink drops. Accordingly, the recording head is driven at a drive frequency being different from that in the non-overlapping raster.

The recording head has a frequency characteristic proper to it. The frequency characteristic of the recording head may be expressed in the form of a characteristic variation of a quantity of an ink drop (ink ejection quantity) ejected from each nozzle of the recording head with respective to a drive frequency at which the recording head is driven. An example of the frequency characteristic of the recording head is shown in FIG. 3. In the graph, the abscissa represents a drive frequency (kHZ) and the ordinate represents an ink ejection quantity (ng=nano gram). As seen from the characteristic curve, to form dots at dot forming positions arrayed successively in the primary scanning operation, the recording head having that frequency characteristic is driven at a maximum drive frequency (=17 kHz) to eject ink drops, each of which has a quantity of 19 ng, from the nozzles to form dots at those positions. To form dots every other dot forming position, the recording head is driven at the half of the maximum drive frequency (=8.5 kHz), and a quantity of each of the ink drops ejected from the nozzles is 15.5 ng.

To form dots at dot forming positions arrayed successively, in the case of the non-overlapping raster, the recording head is driven at 17 kHz (maximum drive frequency) and causes it to eject ink drops each of 19 ng in quantity. In the case of the overlapping raster, to form dots every other dot by using two different nozzles, the recording head is driven at 8.5 kHz to eject ink drops each of 15.5 ng through the nozzles.

For this reason, where the recording head has the FIG. 3 frequency characteristic is used, the total ink ejection quantity of the non-overlapping raster is smaller than that of the overlapping raster. Where the ink quantity is small, the diameter of a formed dot is also small and sometimes, it is seen in different color under influence of other color dots. As a result, the overlapping raster is seen standing out of the non-overlapping raster. In other words, a stripe pattern appears on the picture. This problem is more serious as the number of the overlapping rasters successively formed increases.

SUMMARY OF THE INVENTION

Accordingly, an object of the present invention is to lessen such an unwanted phenomenon that the overlapping raster stands out of the non-overlapping raster in the partial overlapping recording method, and hence to improve the picture quality.

Another object of the present invention is to make inconspicuous the displacement of the dots from their proper positions, which is caused by a head movement error when the recording head is moved in the secondary scanning operation, in the interlacing method.

To achieve the above object, there is provided a first recording device having a recording head including an array consisting of an N (N=a positive integer) number of dot forming elements, which are arrayed at a fixed spatial interval D in a secondary scanning operation as a recording-medium feeding direction, a head drive means for driving dot forming elements, a primary scan drive means for reciprocatively moving the recording head relative to a recording medium in a primary scanning operation, which is orthogonal to the secondary scanning operation, and a secondary scan drive means for feeding a recording medium relative to the recording head in the secondary scanning operation, wherein the recording head records an image while scanning a surface of a recording medium in primary and secondary scanning operations, the improvement being characterized in that the secondary scan drive means determines a secondary scan distance of feeding the recording medium by one secondary scan drive so that the dot forming positions of an M (M=positive integer smaller than N/2) number of upstream dot forming elements, which are located in the upstream end of the dot forming element array as viewed in the secondary scanning operation, in a primary scanning operation, are coincident with the dot forming positions of an M number of downstream dot forming elements, which are located at the downstream end of the dot forming element array in a primary scanning operation after a predetermined number of primary scanning operations are performed, and the head drive means intermittently drives the upstream and downstream dot forming elements so as to form dots exactly at the dot forming positions on the same primary scan line, viz., without doubly forming the dots at the same dot forming position and the formation of no dot at its forming position, and drives the upstream dot forming elements so as to more frequently form the dot toward the upstream side and drives the downstream dot forming elements so as to more frequently form the dot toward the downstream side.

According to another aspect, there is provided a second recording device having a recording head including an array consisting of an N (N=a positive integer) number of dot forming elements, which are arrayed at a fixed spatial interval D in a secondary scanning operation as a recording-medium feeding direction, a head drive means for driving dot forming elements, a primary scan drive means for reciprocatively moving the recording head relative to a recording medium in a primary scanning operation, which is orthogonal to the secondary scanning operation, and a secondary scan drive means for feeding a recording medium relative to the recording head in the secondary scanning operation, wherein the recording head records an image while scanning a surface of a recording medium in primary and secondary scanning operations, the improvement being characterized in that the secondary scan drive means determines a secondary scan distance of feeding the recording medium by one secondary scan drive so that the dot forming positions of an M (M=positive integer smaller than N/2) number of upstream dot forming elements, which are located in the upstream end of the dot forming element array as viewed in the secondary scanning operation, in a primary scanning operation, are coincident with the dot forming positions of an M number of downstream dot forming elements, which are located at the downstream and of the dot forming element array in a primary scanning operation after a predetermined number of primary scanning operations are performed, and the head drive means intermittently drives the upstream and downstream dot forming elements so as to form dots exactly at the dot forming positions on the same primary scan line, viz., without doubly forming the dots at the same dot forming position and the formation of no dot at its forming position, and drives the upstream and downstream dot forming elements so as to more frequently form the dots as the upstream and downstream dot forming elements approach to common use dot forming elements other than the upstream and downstream dot forming elements.

In the first or second recording device, a recording medium is moved in the secondary scanning operation relative to the recording head, so that the dot forming positions of an M number of upstream dot forming elements are coincident with an M number of downstream dot forming elements. The upstream and downstream dot forming elements form dots exactly at the dot forming positions on the same primary scan line, viz., without doubly forming the dots at the same dot forming position and the formation of no dot at its forming position. Accordingly, an M number of primary scan lines (i.e., an M number of overlapping rasters) are formed by the dot forming positions of the M number of upstream dot forming elements and the M number of downstream dot forming elements.

An (N−2M) number of dot forming elements (referred to as "common use dot forming elements") other than the upstream and downstream dot forming elements are driven so as to form dots at all the position at which the dots should be formed. As a result, an (N−2M) number of non-overlapping rasters are formed.

The upstream dot forming elements are driven so as to more frequently form the dot toward the upstream side and the downstream dot forming elements are driven so as to more frequently form the dot toward the downstream side. In other words, the upstream and downstream dot forming elements are both driven so as to more frequently form the dot toward the common use dot forming elements. When the dot forming elements are more frequently driven, a chance of successively driving the dot forming elements also increases. As the dot forming elements are closer in their location to the common use dot forming elements, a frequency at which those elements are driven is closer to a frequency at which the common use dot forming elements are driven (In case of the ink jet printer stated in the related art description, the drive frequency is closer to or equal to that at which the common use dot forming elements are driven.).

Accordingly, as the M number of overlapping rasters is closer to the non-overlapping rasters, a dot diameter variation and a color variation, which are due to the difference between the element driving frequencies, become small in magnitude (in case of the ink jet printer stated in the related art description, the quantity of ejected ink becomes small or is equal to that by the common use dot forming elements). As a result, the phenomenon that the overlapping raster stands out of the non-overlapping raster, i.e., the stripe pattern, is made negligible in view, and this leads to picture quality improvement.

A part of the upstream dot forming element group located close to the common use dot forming elements in a primary scanning operation is coincident with a part (end side) of the downstream dot forming element group remote from the common use dot forming elements in another primary scanning operation performed after a predetermined number of secondary scan drives or secondary scanning operations. A part of the downstream dot forming element group located close to the common use dot forming elements is coincident with a part (end side) of the downstream dot forming element group remote from the common use dot forming elements in a primary scanning operation performed before a predetermined number of secondary scan drives. In other words, in the overlapping raster, the number of dots formed before the secondary scan drive increases as it is closer to the non-overlapping raster formed before the secondary scan drive. And, as it is closer to the non-overlapping raster formed after the secondary scan drive, the number of dots formed after the secondary scan drive increases. This feature achieves one of the objects of the invention, viz., to make inconspicuous the banding caused by the displacement of the dot forming positions in the secondary scanning operation after the secondary scan drive.

A third recording device is provided, which depends from the first or second recording device. In this recording device, P is mutually prime to "k", and P+M=N, where P is an interlacing pitch having a value produced by dividing a secondary scan distance by the secondary scan drive means by a dot-to-dot distance "d" in a recording resolution R as viewed in the secondary scanning operation, and "k" is a dot forming element pitch "k" taking a value produced by dividing a spatial interval D among the dot forming elements by the distance "d".

In the third recording device, the sheet feeding in the secondary scanning operation is carried out every unit distance in the interlacing method. Accordingly, the picture quality is improved in the interlacing method.

A fourth recording device is provided which depends from the first recording device. In this recording device, a sheet feeding pitch P is {2(N−M)−1}, and a dot forming element pitch "k" takes a value produced by dividing a spatial interval D among the dot forming elements by a dot-to-dot distance "d" in a recording resolution R as viewed in the secondary scanning operation, and the "k" is an even number, and the P is mutually prime to the "k", the secondary scan drive means alternately and repeatedly causes a first secondary scan such that the recording medium is moved relative to the recording head in the secondary scan direction by the secondary scan distance of the dot-to-do distance "d" in a recording resolution R as viewed in the secondary scanning operation and a second secondary scan such that the recording medium is moved relative to the recording head in the secondary scanning operation by a distance of P·d (P: sheet feeding pitch, d: do-to-dot distance in a recording resolution as viewed in the secondary scanning operation), in such a way that before the first secondary scan, the head drive means causes the dot forming element array to form dots on the recording medium, while the primary scan drive means causes the recording head to move in one of the forward and backward primary scanning operations, and after the first secondary scan, but before the second secondary scan, the head as drive means causes the dot forming element array to form dots on the recording medium, while the primary scan drive means causes the recording head to move in the other of the forward and backward primary scanning operations.

When the bidirectional recording is performed by the interlacing method, a raster formed before the movement of the secondary scan distance corresponding to the sheet feeding pitch P is different from a raster formed after the movement, in the raster forming direction. If the formation of the raster before the movement is performed by the forward primary scan, the formation of the raster after the movement is performed by the backward primary scan. In the recording head having a plurality of dot forming elements corresponding to a plurality of colors are arranged side by side in the primary scanning operation, when the raster forming directions are different, an order of colors printed by the forward primary scan is different from that by the backward primary scan. The color order difference produces the varying of color. As a result, a stripe pattern appears every secondary scan feeding, sometimes.

In the fourth recording device, two linear rasters formed before and after the first secondary scan are adjacent to each other, and formed by one and the same dot forming element. Thereafter, the sheet is fed, by the second secondary scan, in the secondary scanning operation by a distance (P·d) which is obtained by multiplying the sheet feeding pitch P (=2(N−M−1) by the dot-to-do distance "d" in the recording resolution as viewed in the secondary scanning operation. Subsequently, two linear rasters are formed again before and after the first secondary scan. In this way, the recording on the recording medium is performed every unit raster, which consists of the paired linear rasters formed by the forward and backward primary scans. Accordingly, the whole picture recorded is the aggregate of those unit rasters each consisting of the paired linear rasters. The directions of forming the paired linear rasters are always one direction (e.g., forward direction) and the other direction (e.g., backward direction). Accordingly, if those two linear rasters are handled as a unit, the raster forming directions are the same.

As a result, the whole picture is free from the stripe pattern, which inevitably appears every movement unit of the secondary scanning operation in the bidirectional recording by conventional interlacing method.

Each of the linear rasters is formed by one and the same dot forming element and by the forward or backward primary scan. Accordingly, the printing speed is higher than in the conventional full overlapping recording method.

If the dot diameter is about two times as large as the produce of multiplying the rater-to-raster distance "d" by $\sqrt{2}$, the theory allows the recording to be performed without producing a gap between the adjacent linear rasters formed by the dot forming elements (the sheet background appears in the form of stripe between the adjacent linear rasters, called a white stripe). In actual devices, the dot diameter is selected to be two times as long as the raster-to-raster distance "d", allowing for the deflection of the dot forming element in the secondary scanning operation (called the bending of an ink flight).

In the fourth recording device, one and the same dot forming element is used for forming the paired linear rasters (which form one unit raster). Accordingly, even if the ink flight bending to the secondary scanning operation occurs in the formation of the paired linear rasters, the resultant linear rasters are likewise affected in their configuration by the flight bending. Accordingly, if the dot diameter substantially reaches a theoretical value (rater-to-raster distance "d" x $2^{1/2}$, $2^{1/2}$ is hereinafter referred to as "$\sqrt{2}$"), no gap between both the linear rasters will be formed. Accordingly, even when the invention is applied to an ink jet printer using a pigment ink or inks whose dot diameter is smaller than a value two times as large as the rater-to-raster distance "d", no stripe will be produced between those paired linear rasters.

The present invention also provides a fifth recording device which depends from the first recording device. In this recording device, a sheet feeding pitch P is {2(N−M)−1}, and a dot forming element pitch "k" takes a value produced by dividing a spatial interval D among the dot forming elements by a dot-to-dot distance "d" in a recording resolution R as viewed in the secondary scanning operation, and the "k" is an even number, and the P is mutually prime to the "k", and the secondary scan drive means alternately and repeatedly causes a first secondary scan such that the recording medium is moved relative to the recording head in the secondary scanning operation by the dot-to-dot distance "d" in a recording resolution R as viewed in the secondary scanning operation and a second secondary scan such that the recording medium is moved relative to the recording head in the secondary scanning operation by a distance of P·d (P: sheet feeding pitch, d: dot-to-dot distance in a recording resolution as viewed in the secondary scanning operation), in such a way that before the first secondary scan, the head drive means causes the dot forming element array to form dots on the recording medium, while the primary scan drive means causes the recording head to move in the forward or backward primary scanning operation, and after the first secondary scan, but before the second secondary scan, the head drive means causes the dot forming element array to form dots on the recording medium, while the primary scan drive means causes the recording head to move in the forward or backward primary scanning operation.

The fifth recording device is capable of recording a picture as the aggregate of unit rasters each consisting of the paired linear rasters, as a matter of course. One and the same dot forming element is used for forming the paired linear rasters (which form one unit raster). Accordingly, even if the ink flight bending to the secondary scanning operation occurs in the formation of the paired linear rasters, the resultant linear rasters are likewise affected in their configuration by the flight bending. For this reason, no stripe pattern will be produced between the paired linear rasters formed if the dot diameter is equal to its theoretical value or so. Accordingly, even when the invention is applied to an ink jet printer using a pigment ink or inks, no stripe will be produced between those paired linear rasters.

A sixth recording device of the invention depends from the fourth or fifth recording device. In this recording device, the primary scan drive means, the secondary scan drive means and the head drive means are arranged such that two linear rasters formed by one and the same dot forming element before and after the sheet feeding of the secondary scan distance "d" are handled as a unit raster, and a linear raster adjacent to the unit raster is formed by a dot forming element which is different from the dot forming element used for forming the unit raster.

A seventh recording device depends from the fourth or fifth recording device. In this recording device, an offset a of the secondary scan distance is larger than zero (0), but smaller than a value obtained in a manner that the product of multiplying the distance "d" by, $\sqrt{2}$ is subtracted from a diameter of a dot formed by the dot forming element, and the result of the subtraction is divided by $\sqrt{2}$, and the first secondary scan distance is the sum of the distance "d" and the offset α, and the second secondary scan distance is the result of subtracting the offset from the distance (P·d).

If the paired linear rasters are affected in their formation by the ink flight bending of the dot forming element used, the resultant linear rasters are likewise affected in its configuration by the flight bending. Accordingly, a distance "x" between both the linear rasters is reduced to such a level as defined by the result of dividing the actual dot diameter "a" by $\sqrt{2}$. In other words, even if the actual dot diameter "a" takes its theoretical value (=x x $\sqrt{2}$) relative to the raster-to-raster (, or dot-to-dot) distance "x", a white stripe does not appear between the linear rasters in the recording.

Accordingly, the recording is performed without producing the stripe between the linear rasters if the raster-to-raster distance "x" is defined by $$D < x \leq d + \alpha MAX$$

where αMAX: maximum value of the offset α which is added to the raster-to-raster distance.

However, even if αMAX is set as follows, the printing may be performed without producing a white stripe between the adjacent linear rasters.

$$\alpha MAX = \{a - d \times \sqrt{2}\} \div \sqrt{2}$$

where a: actual dot diameter

If the offset α is selected so as to satisfy D<α≦αMAX, the distance between the rasters formed by the same dot forming element is (d+α). Accordingly, in one gap between the linear rasters no white stripe appears. Another gap between the linear rasters is expanded, and hence even if the dot diameter "a" of an ink drop ejected from the nozzle is relatively small, a width in a picture (line width) in a picture formed by the paired linear rasters may be increased.

The raster-to-raster distance after the sheet is moved by the secondary scan distance P·d is reduced by α. The linear rasters formed before the feeding of the secondary scan distance it (P·d−α) is formed by a dot forming element different from that used for forming the linear rasters after the movement of the secondary scan distance (P·d−α). Therefore, even in a case where a stripe pattern will be formed unless the actual dot diameter=two times as long as the distance "d", no white stripe patter is formed between the white linear rasters if the dot diameter <2d, since the secondary scan distance is selected to be smaller than the distance "a", by α. Accordingly, no white stripe is formed in both the gaps between the paired linear rasters by one dot forming element and between the paired linear rasters by another dot forming element.

A specific value of α is preferably determined, every recording device, by the experiment or the like so that no stripe appears between the paired linear rasters formed before and after the sheet is moved by a secondary scan distance (d+α) and between the paired linear rasters formed before and after the sheet is moved by a secondary scan distance (121*d*+α).

An eighth recording device depends from the fourth or fifth recording device. In this recording device, the first secondary scan distance is the sum of the distance "d" and an offset α, and the second secondary scan distance is the result of subtracting the offset from the distance (P·d), and the offset α is larger than 0, and takes such a value as not to generate a white stripe pattern between adjacent linear rasters formed before and after the sheet feeding of the secondary scan distance (d+α) and between adjacent linear rasters formed before and after the sheet feeding of the secondary scan distance {(P·d)−α}.

A ninth recording device also depends from the fourth or fifth recording device. In this recording device, recording data to form dots in the primary scanning operation before the first secondary scan is set or may be set to be the same as recording data to form dots in the primary scanning operation after the first secondary scan.

A tenth recording device depends from the fourth or fifth recording device. In this recording device, recording data to form dots in the primary scanning operation before the first secondary scan is set or may be set to be the same as recording data to form dots in the primary scanning operation after the first secondary scan.

An eleventh recording device has a recording head including an array consisting of an N (N=a positive integer) number of dot forming elements, which are arrayed at a fixed spatial interval D in a secondary scanning operation as a recording-medium feeding direction, a head drive means for driving dot forming elements, a primary scan drive means for reciprocatively moving the recording head relative to a recording medium in a primary scanning operation, which is orthogonal to the secondary scanning operation, and a secondary scan drive means for feeding a recording medium relative to the recording head in the secondary scanning operation, wherein the recording head records an image while scanning a surface of a recording medium in primary and secondary scanning operations. The eleventh recording device is improved in that the secondary scan drive means determines a secondary scan distance of feeding the recording medium by one secondary scan drive so that the dot forming positions of one upstream end of the dot forming element array as viewed in the secondary scanning operation, in a primary scanning operation, are coincident with the dot forming positions of one downstream dot forming element, which are located at the downstream end of the dot forming element array in a primary scanning operation after a predetermined number of primary scanning operations are performed, and the head drive means intermittently drives the upstream and downstream dot forming elements so as to successively form dots in a ratio of 1 to 1 on the same primary scan line, and the number of dots successively formed is selected so as to make inconspicuous the displacement of the dot forming positions for the upstream dot forming element relative to the dot forming positions for the downstream dot forming element, if the displacement is present.

In the eleventh recording device, the upstream dot forming element and the downstream dot forming element form dots in a ratio of 1 to 1 in number, and those dots are successively formed. The number of those dots formed in succession is selected so that the displacement of the dot forming positions for the upstream and downstream dot forming elements in the secondary scanning operation is inconspicuous.

Accordingly, if the diameter of each dot forming the overlapping raster is small, and its color is seen different from its original one, the color difference is negligible in view since one overlapping raster is used.

As recalled, the upstream dot forming element and the downstream dot forming element form dots in a ratio of 1 to 1 in number, and those dots are successively formed a dot diameter variation and a color variation, which are due to the difference between the element driving frequencies, become small in magnitude (in case of the ink jet printer stated in the related art description, the quantity of ejected ink becomes small or is equal to that by the common use dot forming elements). As a result, the phenomenon that the overlapping raster stands out of the non-overlapping raster, i.e., the stripe pattern, is made negligible in view, and this leads to picture quality improvement.

The number of those dots formed in succession by the upstream dot forming elements and the downstream dot forming elements is selected so that the displacement of the dot forming positions for the upstream and downstream dot forming elements in the secondary scanning operation is inconspicuous. This feature makes inconspicuous the banding caused by the displacement of the dot forming positions in the secondary scanning operation after the secondary scan drive.

A twelfth recording device depends from the eleventh one. In this recording head "k" is an even number, P is mutually prime to "k", and P+1=N, where P is a sheet feeding pitch having a value produced by dividing a secondary scan distance by the secondary scan drive means by a dot-to-dot distance "d" in a recording resolution R as viewed in the secondary scanning operation, and "k" is a dot forming element pitch "k" taking a value produced by dividing a spatial interval D among the dot forming elements by the distance "d".

In the twelfth recording device, the feeding in the secondary scanning operation is performed every unit distance in the interlacing method. In this respect, the picture quality is improved in the interlacing method.

A thirteenth recording device depends from the eleventh one. In this device, a sheet feeding pitch P is 2N−3, and a dot forming element pitch "k" takes a value produced by dividing a spatial interval D among the dot forming elements by a dot-to-dot distance "d" in a recording resolution R as viewed in the secondary scanning operation, and the "k" is an even number, and the P is mutually prime to the "k", the secondary scan drive means alternately and repeatedly causes a first secondary scan such that the recording medium is moved relative to the recording head in the secondary scanning operation by the secondary scan distance in a recording resolution R as viewed in the secondary scanning operation and a second secondary scan such that the recording medium is moved relative to the recording head in the secondary scanning operation by the secondary scan distance obtained by multiplying the sheet feeding pitch P by a recording resolution as viewed in the secondary scanning operation, in such a way that before the first secondary scan, the head drive means causes the dot forming element array to form dots on the recording medium, while the primary scan drive means causes the recording head to move in one of the forward and backward primary scanning operations, and after the first secondary scan, but before the second secondary scan, the head drive means causes the dot forming element array to form dots on the recording medium, while the primary scan drive means causes the recording head to move in the other of the forward and backward primary scanning operations.

The thirteenth recording device produces useful effects comparable with those by the thirteenth recording device, A fourteenth recording device depends from the eleventh recording device. In this recording device, a sheet feeding pitch P is 2N−3, and a dot forming element pitch "k" takes a value produced by dividing a spatial interval D among the dot forming elements by a dot-to-dot distance "d" in a recording resolution R as viewed in the secondary scanning operation, and the "k" is an even number, and the P is mutually prime to the "k", the secondary scan drive means alternately and repeatedly causes a first secondary scan such that the recording medium is moved relative to the recording head in the secondary scanning operation by the secondary scan distance in a recording resolution R as viewed in the secondary scanning operation and a second secondary scan such that the recording medium is moved relative to the recording head in the secondary scanning operation by the secondary scan distance obtained by multiplying the sheet feeding pitch P by a recording resolution as viewed in the secondary scanning operation, in such a way that before the first secondary scan, the head drive means causes the dot forming element array to form dots on the recording medium, while the primary scan drive means causes the recording head to move in the forward or backward primary scanning operation, and after the first secondary scan, but before the second secondary scan, the head drive means causes the dot forming element array to form dots on the recording medium, while the primary scan drive means causes the recording head to move in the forward or backward primary scanning operation.

A fifteenth recording device depends from the thirteenth or fourteenth recording device. In this device, means and the head drive means are arranged such that two linear rasters formed by one and the same dot forming element before and after the sheet feeding of the secondary scan distance "d" are handled as a unit raster, and a linear raster adjacent to the unit raster is formed by a dot forming element which is different from the dot forming element used for forming the unit raster.

A sixteenth recording device depends from the thirteenth or fourteenth recording device. In this recording device, an offset α of the secondary scan distance is larger than zero (0), but smaller than a value obtained in a manner that the product of multiplying the distance "d" by √2 is subtracted from a diameter of a dot formed by the dot forming element, and the result of the subtraction is divided by √2, and the first secondary scan distance is the sum of the distance "d" and the offset α, and the second secondary scan distance is the result of subtracting the offset from the distance (P·d).

The sixteenth recording device produces useful effects comparable with those by the seventh recording device.

A seventeenth recording device depends from the thirteenth or fourteenth recording device. In this recording as device, the first secondary scan distance is the sum of the distance "d" and an offset α, and the second secondary scan distance is the result of subtracting the offset from the distance (P·d), and the offset α is larger than 0, and takes such a value as not to generate a white stripe pattern between adjacent linear rasters formed before and after the sheet feeding of the secondary scan distance (d+α) and between adjacent linear rasters formed before and after the sheet feeding of the secondary scan distance {(P·d)−α}.

An eighteenth recording device depends from the thirteenth or fourteenth recording device. In this recording device, recording data to form dots in the primary scanning operation before the first secondary scan is set or may be set to be the same as recording data to form dots in the primary scanning operation after the first secondary scan.

A nineteenth recording device depends from the sixth device. In this recording device, recording data to form dots in the primary scanning operation before the first secondary scan is set or may be set to be the same as recording data to form dots in the primary scanning operation after the first secondary scan.

Features and advantages of the invention will be evident from the following detailed description of the preferred embodiments described in conjunction with the attached drawings.

DETAILED DESCRIPTION OF THE PREFERRED EMBODIMENTS

Construction of a Color Ink Jet Printer 1

Figure 1:
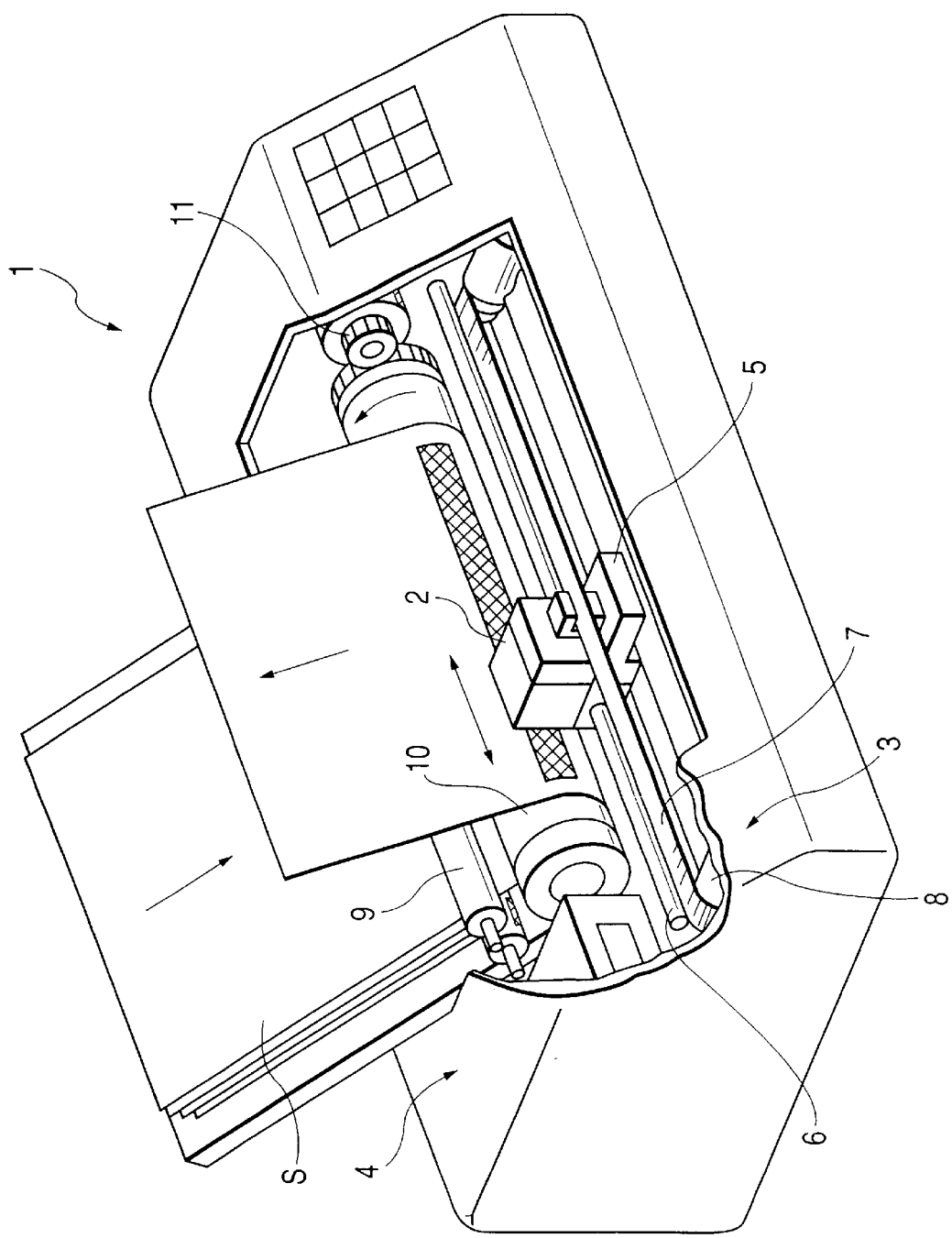
FIG. 1 is a perspective view showing an ink jet printer 1 as one form of a "recording device" constructed according to the present invention.

FIG. 1 is a perspective view (partially broken) showing a color ink jet printer 1 which is one form of a "recording device" constructed according to the present invention. The color ink jet printer (referred to simply as a "printer") 1 includes a recording head 2 for printing (recording) an image on a printing sheet 5 as one form of "recording medium", a primary scan driver 3 as a "primary scan drive means", and a secondary scan driver 4 as a "secondary scan drive means".

Figure 2A:
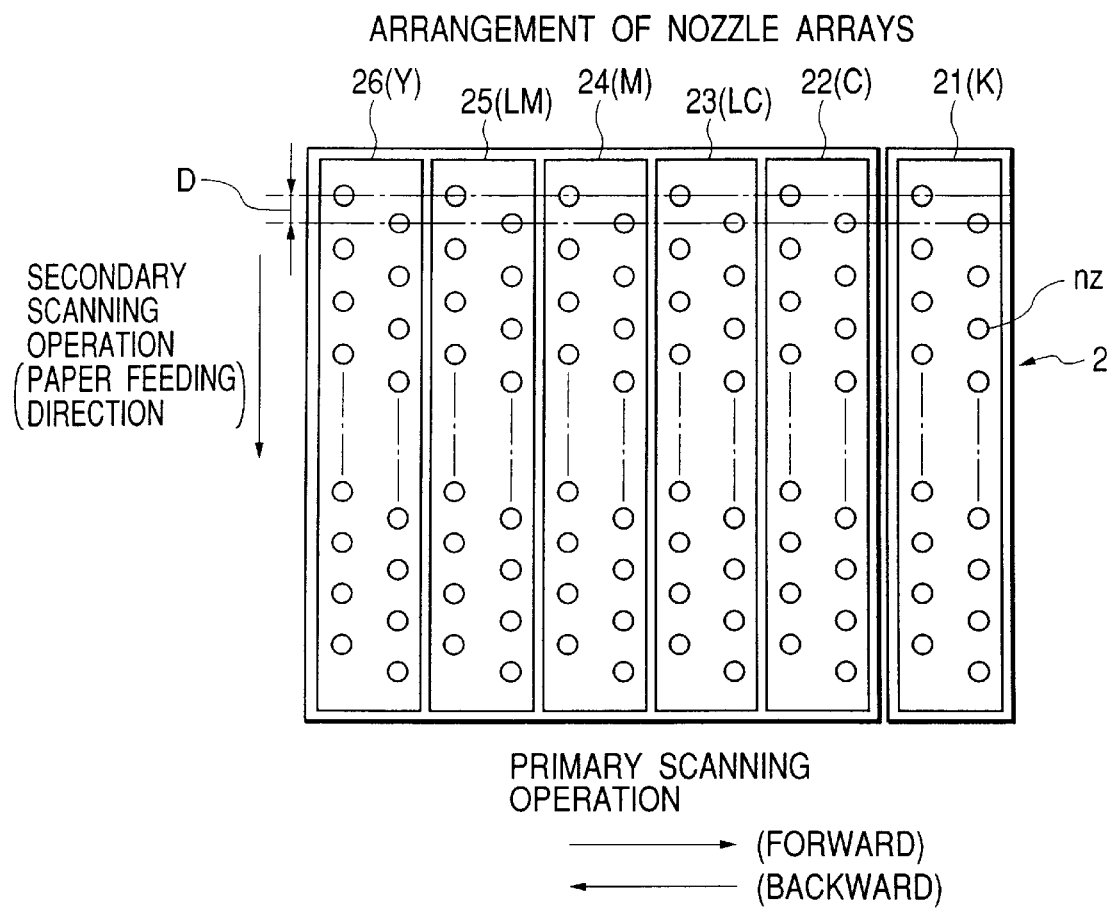
FIG. 2A is a diagram for explaining an arrangement of nozzle arrays each consisting of nozzles as "dot forming elements" formed in a surface of a recording head, which will face a recording medium.

Ink jet nozzle orifices (referred to simply as "nozzles") as one form of "dot forming elements" are formed in a surface (referred to as a "head surface") of the recording head 2, which will face a printing sheet S. FIG. 2A is a diagram for explaining an arrangement of nozzle arrays formed in the head surface of the recording head 2. As shown, the recording head 2 includes six nozzle arrays 21 to 26 for six color inks. Those nozzle arrays 21 to 26 eject color ink drops of black (K), dark cyan (C), light cyan (LC), dark magenta (M), light magenta (LM), and yellow (Y).

Each of the nozzle arrays 21 to 26 consists of a plurality of nozzles "nz" (64 nozzles in the embodiment), which are arrayed at a fixed nozzle interval D in zig-zag fashion in the secondary scanning operation. The interval D is selected to be integer times (even number times in the embodiment) as large as a dot-to-dot space "d" in a recording resolution R as viewed in the secondary scanning operation. This positive integer (even number) k is called "nozzle pitch". In the embodiment, the recording resolution R in the secondary scanning operation is 720 DPI, and the nozzle pitch "k" is 4 (k=4). Accordingly, the dot-to-dot space (=raster-to-raster space) "d" is: $d = 1 \div 720$ inches $\approx 35.3$ $\mu$m. The interval D is: $D = k \times d \approx 141.1$ $\mu$m.

The nozzles nz of each nozzle array are not always arrayed in zig-zag fashion. If required, the nozzles may be linearly arrayed. However, the arraying of the nozzles in zig-zag fashion is advantageous in that it is easy to reduce the nozzle pitch "k" in the manufacturing stage.

Figure 2B:
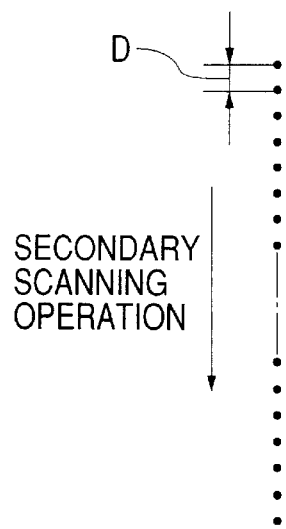
FIG. 2B is a diagram showing an array of dots formed by one nozzle array.

FIG. 2B is a diagram showing an array of dots formed by one nozzle array. One nozzle array is driven by a head driver so that dots formed by ink drops ejected from the nozzle array are substantially linearly arrayed in the secondary scanning operation whether or not the nozzles are arrayed in zig-zag or linear fashion. As will be described later, in each of the nozzle arrays 21 to 26, all the nozzles are not always used. In some recording methods, some of them are used frequently.

Figure 7:
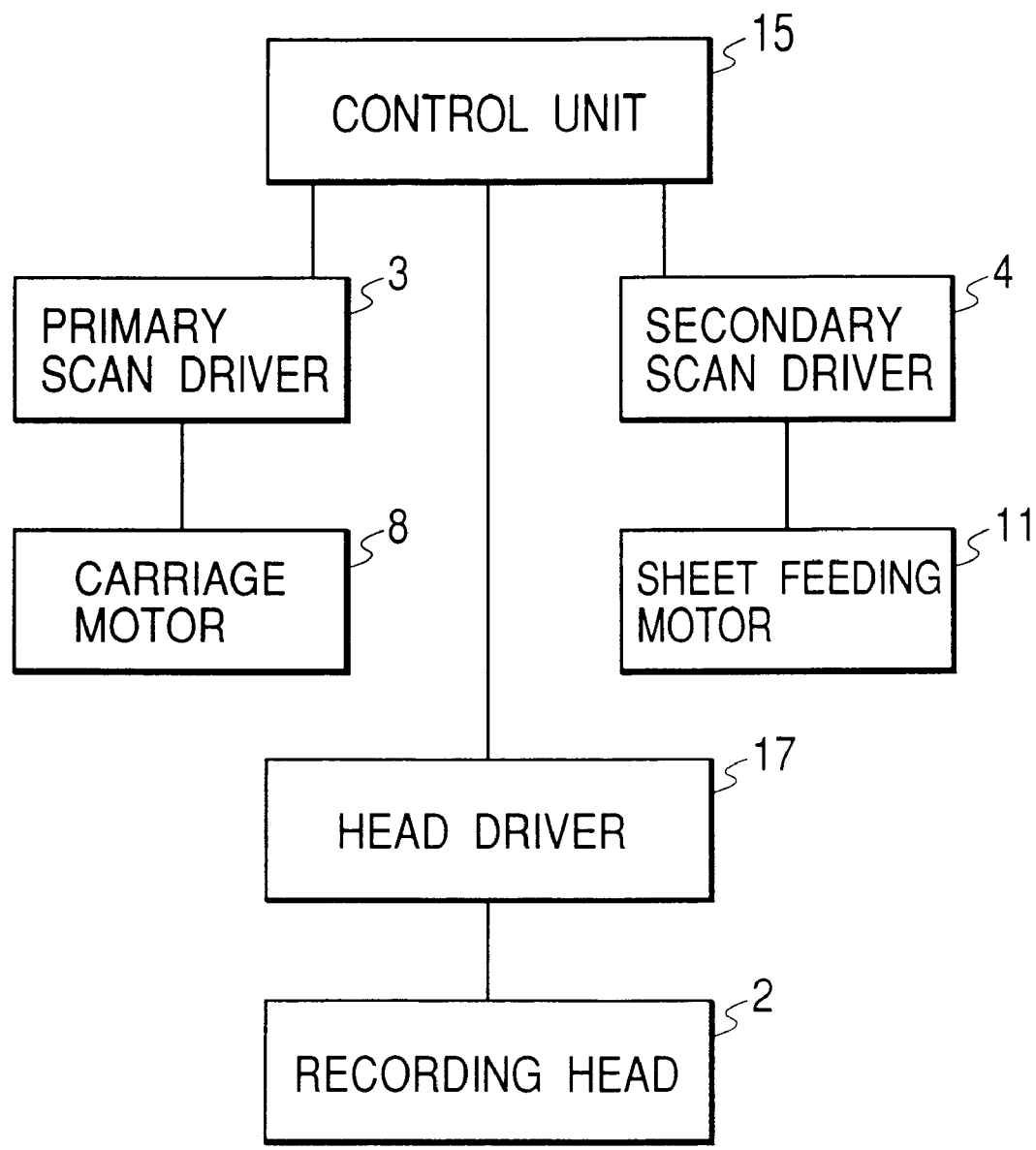
FIG. 7 is a block diagram showing an arrangement of the "recording device" of the invention.

As shown in FIG. 7, under control of a control unit 15 as "control means", the nozzles of each of those nozzle arrays 21 to 26 of the recording head 2 are driven by a head driver 17 as "head drive means" and eject ink drops to a printing sheet S, thereby printing on the printing sheet.

Figure 3:
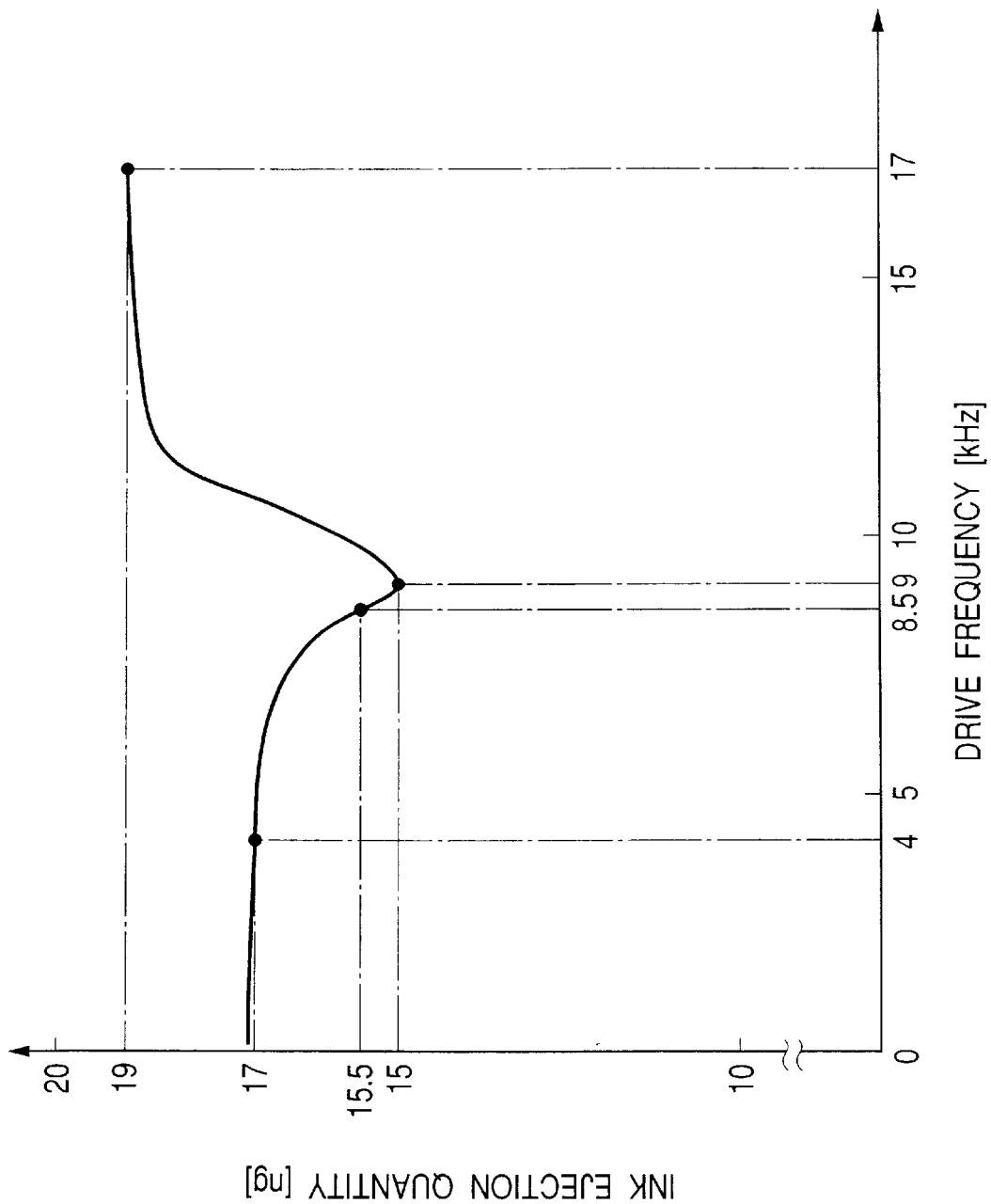
FIG. 3 is a graph showing a frequency characteristic of a recording head.

FIG. 3 is a graph showing a frequency characteristic of the recording head 2. In the graph, the abscissa represents a drive frequency (kHz) and the ordinate represents an ink ejection quantity (ng=nano gram). To form a succession of dots at dot forming positions arrayed in the primary scanning operation, the recording head 2 is driven at 17 kHz of the maximum drive frequency, and ejects ink drops to a printing sheet to form dots thereon. In this case, the quantity each ink drop ejected is 19 ng. To form dots at every other dot forming position, the recording head is driven at 8.5 kHz ($= \frac{1}{2}$ the maximum drive frequency), and ejects ink drops each of 15.5 ng to form dots on the printing sheet.

Returning to FIG. 1, the primary scan driver 3 includes a carriage 5 onto which the recording head 2 is fastened, a guide rail 6, an endless belt 7, and a carriage motor (e.g., a stepping motor, a DC motor) 8. Under control of the control unit 15, the carriage motor 8 is driven to rotate, and the carriage 5 is reciprocatively moved in the primary scanning operations along the guide rail 6 with the aid of the endless belt 7.

The secondary scan driver 4 includes a roller pair 9, a roller 10, a sheet feeding motor (e.g., a stepping motor, a DC motor) 11. The sheet feeding motor 11 is rotated and stopped in its rotation under control by the control unit 15. When the sheet feeding motor 11 is driven to rotate by the control unit 15, the printing sheet S is pulled by the roller pair 9 and fed to the secondary scanning operation by the roller 10.

As shown in FIG. 7, the control unit 15 controls the primary scan driver 3, the secondary scan driver 4 and the head driver 17, whereby an image is printed on the printing sheet S by any of recording methods to be described hereunder.

First Recording Method

Figure 4:
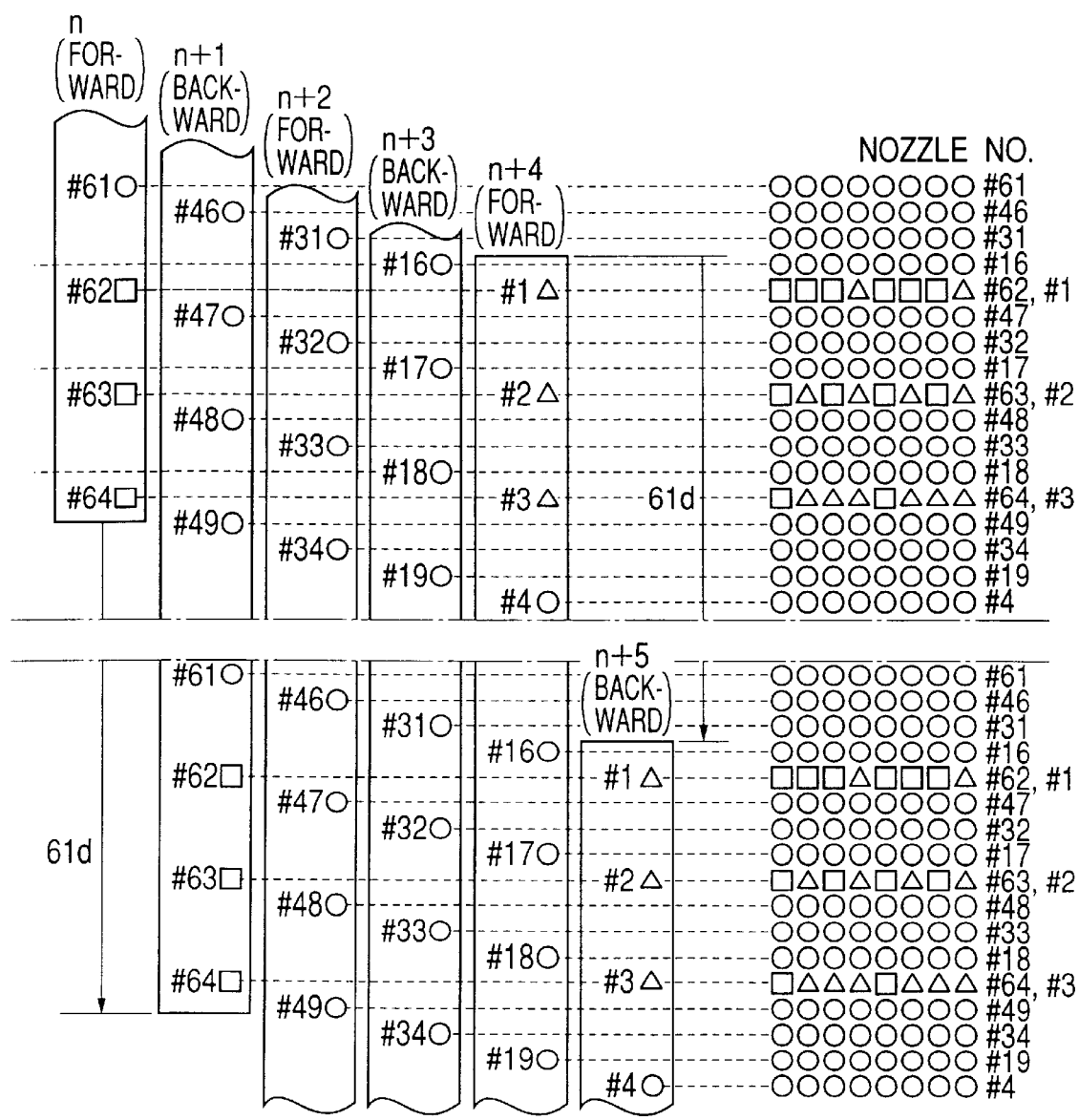
FIG. 4 is a diagram for explaining the forming of dots by a first recording method employed by the printer.

FIG. 4 is a diagram for explaining the forming of dots by a first recording method employed by the printer 1.

In the first recording method, the number N of nozzles is 64 (N=64), the number M of upstream nozzles as "upstream dot forming elements" is 3 (M=3), and the number M of downstream nozzles as "downstream dot forming elements" is 3 (M=3). In this method, 64 nozzles of the nozzle arrays 21 to 26 are all used. Of those nozzles, the three upstream nozzles #62 to #64 and the downstream nozzles #1 to #3 eject ink drops to form dots exactly at the dot forming positions on the same primary scan line, viz., without doubly forming the dots at the same dot forming position and the formation of no dot at its forming position. In the description to follow, the nozzles #4 to #6, which are located between the upstream nozzles and the downstream nozzles will be referred to as "common use nozzles".

A sheet feeding pitch P is mutually prime to a nozzle pitch "k" (=4), and chosen to be 61 (P=61) so as to satisfy a relation P+M=N=64. Accordingly, a secondary scan distance T is 2.15 mm (T=P×d≈2.15 mm).

Since k=4, when the sheet feeding of a secondary scan distance T is repeated four times, the upstream nozzle #62 and the downstream nozzle #1 are located on the same primary scan line. The same thing is correspondingly applied to the upstream nozzle #63 and the downstream nozzle #2, and the upstream nozzle #64 and the downstream nozzle #3.

The head driver 17 performs such a control that the upstream nozzle more frequently forms the dot toward the upstream side, while the downstream nozzle more frequently forms the dot toward the downstream side.

In the embodiment, the upstream nozzle #62 is controlled by the head driver 17 such that the formation of a combination of a succession of 3 dots and a vacancy corresponding to one dot is repeated. The downstream nozzle #1, which will be located on the same primary scan line as of the nozzle #1, is controlled, by the head driver 17, so as to form a dot at the vacancy position at which no dot was formed by the upstream nozzle #62, viz., to repeat the formation of a combination of a succession of vacancies corresponding to three dots and one dot.

Under control of the head driver 17, the downstream nozzle #63 repeats the formation of one dot and a vacancy corresponding to one dot, and the upstream nozzle #2 which will be located on the same primary scan line as of the nozzle #63, repeats the formation of a dot at the vacancy position at which no dot was formed by the nozzle #63.

The upstream nozzle #64 repeats the formation of a combination of one dot and a succession of vacancies corresponding to three dots, under control of the head driver 17. The downstream nozzle #3, which will be located on the same primary scan line as of the nozzle 64, repeats the formation of dots at the three vacancy positions at which no dots were formed by the nozzle #64, more exactly a combination of a succession of three dots and one vacancy corresponding to one dot.

FIG. 4 depicts a dot formation (raster formation) by the primary scanning operations from the n-th primary scan (as counted from the printing start) to the (n+5)th primary scan. of those primary scanning operations, the n-th, (n+2)th and (n+4)th primary scanning operationss are the forward scanning operations. The (n+1)th, (n+3)th and (n+5)th primary scanning operations are backward scanning operations.

In the illustration of FIG. 4, each raster consists of eight dots. Actually, the number of dots forming one linear raster is changed case by case. Sometimes, one linear raster consists of dots whose number is larger or smaller than eight dots form one raster. Dots are formed at dot forming positions, and no dots are formed at positions at which no dots should be formed. The same thing is correspondingly applied to recording methods shown in FIGS. 5 and 6.

In the n-th forward primary scan, a raster consisting of white circle dots are formed by the common use nozzles #4 to #61, a raster consisting of white triangular dots are formed by the downstream nozzles #1 to #3, and a raster consisting of white square dots are formed by the upstream nozzle *62 to #64. In FIG. 4, the raster formation by only the nozzles #61 to #64 is illustrated.

After the n-th primary scan, the printing sheet S is fed downstream in the secondary scanning operation by the secondary scan distance T. In FIG. 4, the recording head 2 is so moved instead of the printing sheet S. As already stated, the secondary scan distance T is equal to the sheet feeding pitch P (=61). As the result of the feeding of T, the nozzle #46 is moved upstream (downward in FIG. 4) of the nozzle #61 as viewed in the secondary scanning operation, by one dot.

After the feeding, in the (n+1) th primary scanning operation by the backward scan, dots are formed at positions located upstream (downward in FIG. 4) of the n-th raster as viewed in the feeding direction, by one dot.

In this way, series of dots (rasters) are formed on the (n+2)th, (n+3)th and (n+4)th primary scan lines, while repeating the forward and backward primary scanning operations and feeding the printing sheet in the secondary scanning operation by the secondary scan distance T(=61d), and finally a whole picture is formed.

The dots (white circles) of the non-overlapping rasters, a which are formed by the common use nozzles #4 to #61, are each formed using an ink drop of 19 ng, ejected from the recording head drive at the maximum drive frequency 17 kHz. Of three dots (white squares) of the overlapping raster formed by the upstream nozzle #62, the first dot is formed by an ink drop of 15.5 ng ejected from the recording head driven at the drive frequency of 8.5 kHz. The remaining two dots are each formed by an ink drop of 19 ng ejected from the recording head driven at 17 kHz. The dots (white triangles) formed by the nozzle #1, which fill the vacant dots produced by the upstream nozzle #62, are formed under condition that the drive frequency=4.25 kHz (=¼ maximum drive frequency) and the ink ejection quantity 17 ng. The same thing is correspondingly applied to the overlapping rasters formed by the downstream nozzle #3 and the upstream nozzle #64.

Where the overlapping raster is formed by printing dots very other dot by using the nozzles #62 and #1 or the nozzles #3 and #64 as in the conventional partial overlapping recording method, the ink ejection quantity for each dot is 5.5 ng, and the drive frequency is 8.5 kHz.

In the first recording method described above, the ink ejection quantity for the dots forming the overlapping raster may be close to the ink ejection quantity for the dots forming the non-overlapping raster adjacent to the overlapping raster. This feature suppresses the formation of the stripe patterns in the picture, which are due to the ink ejection quantity difference between the overlapping raster and the non-overlapping raster, and hence improves the picture quality.

In the n-th primary scanning operation, the upstream nozzle #62 located close to the common use nozzles (#4 to #61) forms an overlapping raster, in cooperation with the downstream nozzle #1, which is remote from the common use nozzles (#4 to #61), in the primary scan after the subsequent four secondary scan driving operations. The number of dots formed by the upstream nozzle #62 before the secondary scan drive is larger than the number of dots formed by the downstream nozzle #1 after the secondary scan driving operation. The downstream nozzle #3 located close to the common use nozzles (#4 to #61) forms an overlapping raster in cooperation with the upstream nozzle #1, which is remote from the common use nozzles (#4 to

61) and on the primary scan before four times of secondary scan drives or secondary scanning operations. The number of dots formed by the downstream nozzle #3 after the secondary scan drive is larger than the number of dots formed by the upstream nozzle #64 before the secondary scan drive. This feature makes inconspicuous the banding caused by the displacement of the dots from the proper dot forming positions.

Second Recording Method

Figure 5:
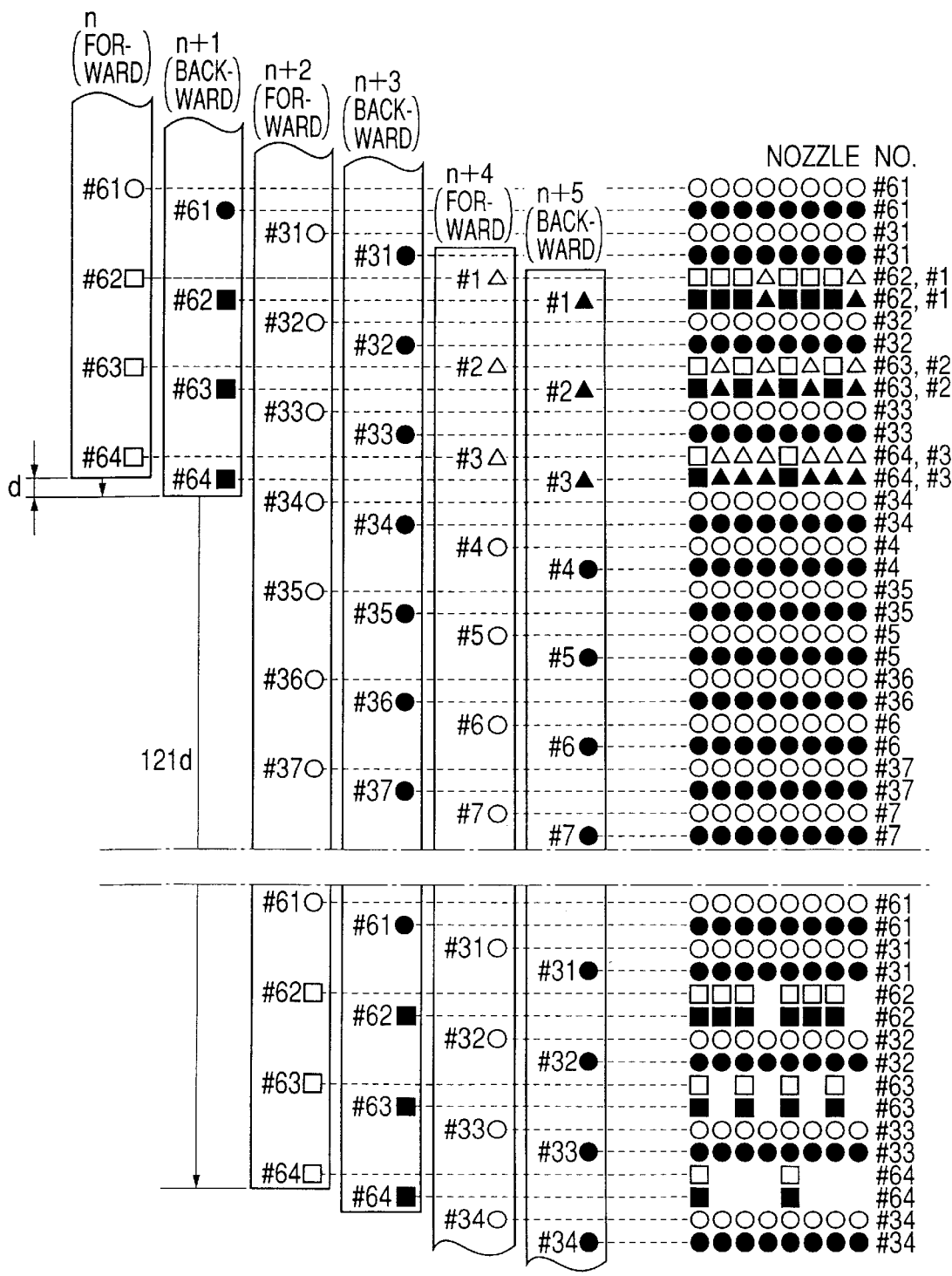
FIG. 5 is a diagram for explaining the forming of dots by a second recording method employed by the printer.

FIG. 5 is a diagram for explaining the forming of dots by a second recording method employed by the printer 1. The second recording method is substantially the same as the first recording method except the following points. The sheet feeding pitch P is: P=2(N−M)−1=2×(64−3)−1=121. For the secondary scan feeding, the feeding of one dot (secondary scan distance T1=d=35.3 μm) and the feeding of P=121 dots (secondary scan distance T2=P×d=121d=4.27 mm) are alternately repeated. Incidentally, the condition that P is mutually prime to "k" is satisfied in the second recording method.

In FIG. 5, there is shown the formation of dots (i.e., rasters) by six primary scanning operations from the n-th primary scanning operation after the start of printing to the (n+5)th primary scanning operation. Of those primary scanning operations, the n-th, (n+2)th and (n+4)th primary scanning operations are forward scanning operations, and the (n+1)th, (n+3)th and (n+5)th primary scanning operations are backward scanning operations. The dots formed by the forward primary scanning operations are illustrated as white circles, squares and triangles, and the dots formed by the backward primary scanning operations are illustrated as black circles, squares and triangles.

In the n-th forward primary scanning operation, the common use nozzles #4 to #61 form a raster of white circle dots; the upstream nozzles #62 to #64 form a raster of white square dots; and the downstream nozzles #1 to #3 form a raster of white triangle dots (in FIG. 5, there is illustrated the raster formation by only the nozzles #61 to #64.).

After the n-th primary scanning operation, the printing sheet S is fed downstream by a secondary scan distance T=d as viewed in the secondary scanning operation. In FIG. 5, the recording head 2 is so moved instead of the printing sheet S.

In the (n+1)th primary scanning operation of the backward scan after the feeding of the printing sheet, a raster of black circle dots is formed by the common use nozzles #4 to #64; a raster of black square dots is formed by the upstream nozzles #62 to #64; and a raster of black triangle dots is formed by the downstream nozzles #1 to #3. In FIG. 5, there is illustrated the raster formation by only the nozzles #61to#64. Two adjacent rasters are formed through the forward and backward scanning operations of one and the same nozzle.

Subsequently, the printing sheet S is fed downstream in the secondary scanning operation by the secondary scan distance T2(=121d). The secondary scan distance T2 corresponds to the sheet feeding pitch P (P=121 dots). Accordingly, the nozzle #31 is positioned upstream (downward in FIG. 5) of the nozzle #61 as viewed in the secondary scanning operation, by one dot.

One and the same nozzle forms two adjacent rasters also through the (N+2)th primary scanning operation of the forward scan which is performed after the sheet feeding, and the (n +3)th primary scanning operation of the backward scan which is performed after the subsequent sheet feeding of the secondary scan distance T1, as in the case of the n-th and (n+1)th primary scanning operations of the forward and backward scans.

Also through the (N+4)th primary scanning operation of the forward scan which is performed after the sheet feeding of the secondary scan distance T2, and the (n+5)th primary scanning operation of the backward scan which is performed after the subsequent sheet feeding of the secondary scan distance T1, one and the same nozzle forms two adjacent rasters as in the case of the n-th and (n+1)th primary scanning operations of the forward and backward scans.

In this way, while repeating alternately the sheet feeding of the secondary scan distance T1 and the sheet feeding of the secondary scan distance T2, a picture is progressively recorded with two adjacent linear rasters as a unit raster. The non-overlapping raster formed by the common use nozzles #4 to #61 and the overlapping raster by the upstream nozzles #62 to #64 and the downstream nozzles #1 to #3 are both formed with two adjacent linear rasters as a unit raster. Accordingly, the overlapping raster consists of six linear rasters, two times as many as of the linear rasters in the first recording method. Generally, the stripe pattern caused by the reduction of the ink ejection quantity reduction in the overlapping raster becomes conspicuous with increase of the number of overlapping linear rasters. In this connection, it is noted that the ink ejection quantity difference between the overlapping raster and the non-overlapping raster may be reduced in the second recording method. Therefore, the second recording method successfully suppresses the generation of the stripe patterns. The method also lessens in view the banding caused by the displacement of the dots from their proper positions, which results from the movement error of the head in the secondary scanning operation, as a matter of course.

As recalled, the whole picture recorded is formed in such a way that the two adjacent linear rasters ejected by one and the same nozzle are used as a unit raster. In a case where the conventional interlacing recording method is applied to the bidirectional recording, the directions of forming two linear rasters formed are different from each other. Those rasters are formed in such a way that a linear raster is formed by a primary scanning operation, the printing sheet is fed in the secondary scanning direction, another linear raster is formed by the next secondary scanning operation. That is, one linear raster is formed by the forward primary scanning operation, and the other linear raster is formed by the backward one.

In the case of color printing, the nozzles of a plurality of color inks are arrayed in the primary scanning operation on the recording head 2, as shown in FIG. 2. Accordingly, the colors recorded in the forward scan direction are reverse in their arraying order to those In the backward scan direction.

For this reason, when the conventional interlacing method is applied to the bidirectional recording, the order in which the recorded colors are arrayed is reversed every feeding in the secondary scanning operation. Accordingly, the picture color varies every secondary scan feeding. This appears as stripe patterns in the resultant picture.

In this connection, it is noted that in the second recording method, a picture is the aggregate of linear raster pairs, and the paired linear raster are formed always in the same direction. Therefore, the second recording method successfully eliminates the stripe pattern appearing every secondary scan feeding in the bidirectional recording by the conventional interlacing method.

In the second recording method, each linear raster is formed by either of the forward and backward primary scanning operations and by using one and the same nozzle.

Therefore, the recording speed of the second recording method is higher than that of the conventional full-overlapping recording method.

Since the same nozzle is used for forming the paired linear rasters, the deflection to the secondary scanning operation (called the ink flight bending) that one of the paired linear rasters has is equal to that of the ink drop for forming the other one. Accordingly, if the nozzle has a tendency to bend an ink flight in the secondary scanning operation, the resultant two linear rasters are based on the same bending of ink flight.

To arrange the linear rasters with little gap between the adjacent linear rasters, what a designer has to do is to select the diameter of a dot formed by the ink drop to be equal to the product of multiplying the raster-to-raster distance "d" by $\sqrt{2}$ (=d×$\sqrt{2}$). Usually, the nozzle has a tendency of bending the ink flight.

In the second recording method, the two linear raster patterns formed by one and the same nozzle may be considered to be substantially free from the flight bending. Accordingly, the dot diameter may be selected to be substantially equal to the product of d×$\sqrt{2}$. When an ink made of dye is used, the diameter (referred to as "minimum diameter") of a dot formed by the minimum ink ejection quantity of 15 ng (see FIG. 3) is about 70 $\mu$m, about two times as large as the distance "d" ($\approx$35.3 $\mu$m). When the ink made of pigment is used, it is only 60 $\mu$m or thereabout, which is shorter than the distance that is two times as large as the distance "d". Even in the case using the pigment ink, the second recording method successfully prevents a gap from appearing between the adjacent linear rasters (the sheet background appears in the form of stripe between the adjacent linear rasters, called a white stripe).

The paired linear rasters that are printed by the same nozzle may be based on the same print data. The raster may also be printed by different print data respectively provided for those rasters. In the case of using the same print data for printing both the linear rasters, a print of 720DPI (recording resolution in the secondary scanning operation) may be realized by using the quantity of recording data corresponding to 360DPI, viz., ½of the data quantity for 720DPI. Thus, the second recording method succeeds in reducing the required recording quantity. Accordingly, a time taken for generating the recording data is reduced, so that the printing speed is also increased.

Third Recording Method

Figure 6:
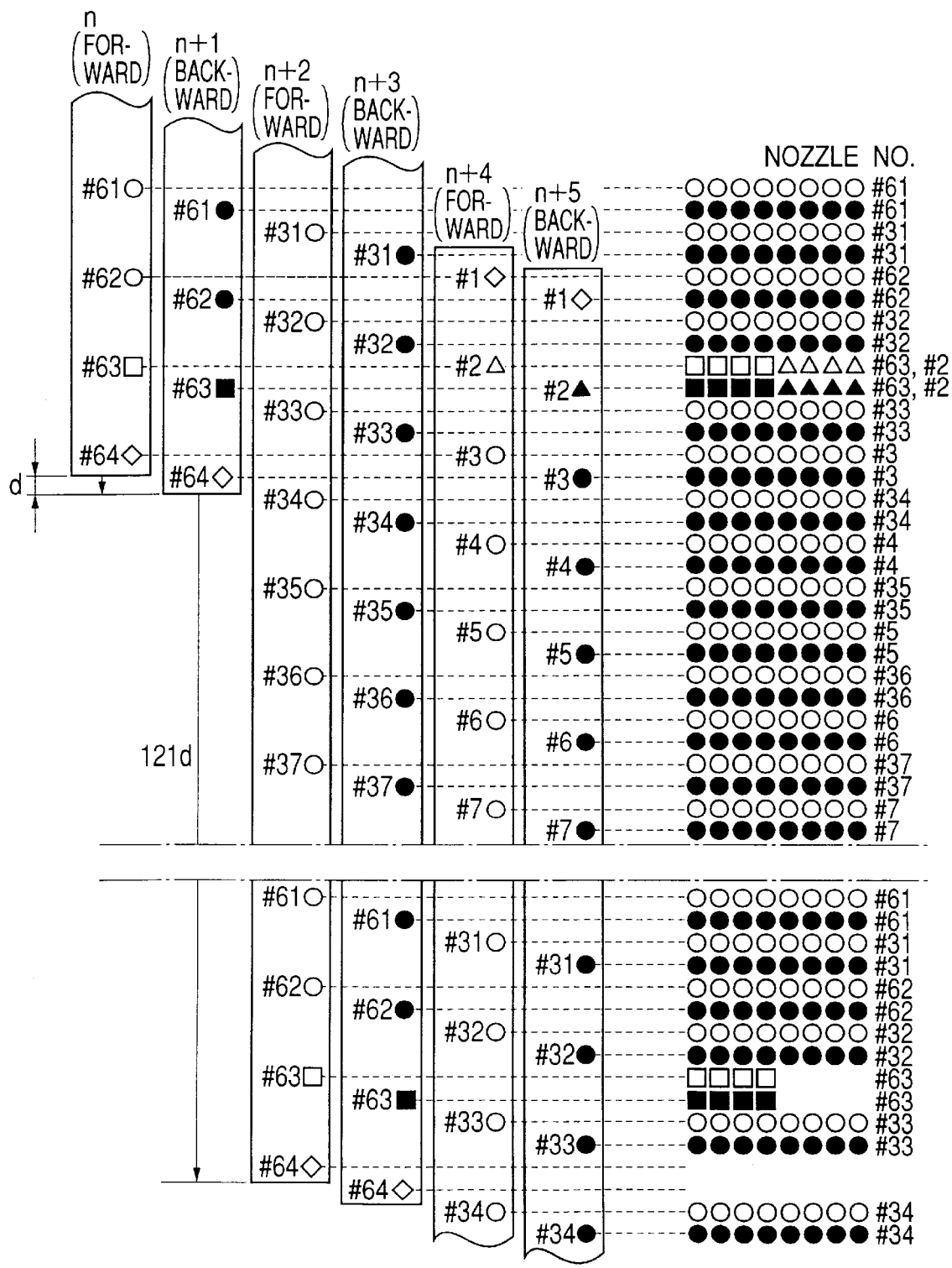
FIG. 6 is a diagram for explaining the forming of dots by a third recording method employed by the printer.

FIG. 6 is a diagram for explaining the forming of dots by a third recording method employed by the printer 1.

In the third recording method, of 64 nozzles, the nozzles #1 and#64 are not used for printing, and the remaining 63 nozzles #2 to #63 are used for printing. In this method, N (number of nozzles)=62. Of those nozzles, one nozzle #63 located at the upstream end is used as the upstream nozzle. One nozzle #2 located at the downstream end is used as the downstream nozzle. The remaining nozzles #3 to #62 are common use nozzles.

The sheet feeding pitch P is, P=2N−3=124−3=121. For the secondary scan feeding, the feeding of one dot (secondary scan distance T1=d=35.3 $\mu$m) and the feeding of P=121 dots (secondary scan distance T2=P×d=121d=4.27 mm) are alternately repeated. Incidentally, the condition that P is mutually prime to "k" is satisfied.

The upstream nozzle #63 and the downstream nozzle #2 form dots in a ratio of 1 to 1 in number under control of the head a driver 17, and those dots are successively formed. The number of those dots formed in succession is selected so that the displacement of the dots formed by the nozzle #63 from the dots by the nozzle #2 in the secondary scanning operation is inconspicuous, and that those nozzles are alternately driven. Such a number of dots is preferably 4. This was confirmed by our experiment. Accordingly, the nozzle #63 and the nozzle #1 are alternately driven to form a succession of four dots, and form an overlapping raster.

In FIG. 6, there is shown the formation of dots (i.e., rasters) by six primary scanning operations from the n-th primary scanning operation after the start of printing to the (n+5)th primary scanning operation. Of those primary scanning operations, the n-th, (n+2)th and (n+4)th primary scanning operations are forward scanning operations, and the (n+1)th, (n+3)th and (n+5)th primary scanning operations are backward scanning operations. The dots formed by the forward primary scanning operations are illustrated as white circles, squares and triangles, and the dots formed by the backward primary scanning operations are illustrated as black circles, squares and triangles. Diamond marks are used for indicating the nozzles #1 and #64.

In the n-th primary scanning operation of the forward a scan, the common use nozzles #3 to #62 form a raster of white dots; the upstream nozzle #63 forms a raster of white square dots; and the downstream nozzle #2 forms a raster of white triangle dots. FIG. 6 illustrates the raster formation by the nozzles #61 to #63.

After the n-th primary scanning operation, the printing sheet S is fed downstream in the secondary scanning operation by a distance secondary scan distance T1, the printing sheet S is fed downstream in the secondary scanning operation by a secondary scan distance T1 (=d). In FIG. 6, the recording head 2 is so moved instead of the printing sheet S.

In the (n+1)th primary scanning operation of the backward scan after the feeding of the printing sheet, a raster of black circle dots is formed by the common use nozzles #3 to #6; a raster of black square dots is formed by the upstream nozzles #63; and a raster of black triangle dots is formed by the downstream nozzles #2 to #3. In FIG. 6, there is illustrated the raster formation by only the nozzles #61 to #63. Two adjacent rasters are formed through the forward and backward scanning @ operations of one and the same nozzle.

Subsequently, the printing sheet S is fed downstream in the secondary scanning operation by the secondary scan distance T2 (=121d). The secondary scan distance T2 corresponds to the sheet feeding pitch P (P=121 dots). Accordingly, the nozzle #31 is positioned upstream (downward in FIG. 6) of the nozzle #61 as viewed in the secondary scanning operation, by one dot.

One and the same nozzle forms two adjacent rasters also through the (N+2)th primary scanning operation of the forward scan which is performed after the sheet feeding, and the (n +3)th primary scanning operation of the backward scan which is performed after the subsequent sheet feeding of the secondary scan distance T1, as in the case of the n-th and (n+1)th primary scanning operations of the forward and backward scans.

Also through the (N +4)th primary scanning operation of the forward scan which is performed after the sheet feeding of the secondary scan distance T2, and the (n+5)th primary scanning operation of the backward scan which is performed after the subsequent sheet feeding of the secondary scan distance T1, one and the same nozzle forms two adjacent rasters as in the case of the n-th and (n+1)th primary scanning operations of the forward and backward scans.

In this way, while repeating alternately the sheet feeding of the secondary scan distance T1 and the sheet feeding of the secondary scan distance T2, a picture is progressively recorded with two adjacent linear rasters as a unit raster. The non-overlapping raster formed by the common use nozzles #3 to #62 and the overlapping raster by the upstream nozzles #63 and the downstream nozzles #2 are both formed with two adjacent linear rasters as a unit raster.

In the third recording method, for the overlapping raster, the operation to form a succession of four dots by the nozzle #63 and the operation form a succession of four dots by the nozzle #2 are repeated. Of those successive four dots, the first dot is formed by driving the recording head 2 at the drive frequency (=4.25 kHz (=17/4) and hence by using about 7 ng as the ink ejection quantity (FIG. 3). The remaining three dots are formed at 17 kHz and by about 19 ng (FIG. 3). Therefore, the dot ink ejection quantity of the overlapping raster is made close to that of the non-overlapping raster adjacent to the former. As a result, the stripe pattern generation is suppressed, and the print quality is improved.

Further, the overlapping raster is formed by using only two linear rasters. Accordingly, even if the dot ink ejection quantity difference is present, the effect resulting from the ink ejection quantity difference is made inconspicuous by a level corresponding to the reduced number of linear rasters. This leads to improvement of the picture quality.

After the dot formation by the nozzle #63, even if an error is present in the sheet movement to the secondary scanning operation, which is carried out before the dot formation by the nozzle #2, the banding caused by the displacement of the dots from their proper positions is also made inconspicuous since those nozzles are alternately driven and each nozzle forms four dots. This feature also improves the picture quality.

In the third recording method, the printing sheet may be fed every secondary scan distance T under conditions that the sheet feeding pitch P is mutually prime to the nozzle pitch "k", P (sheet feeding pitch)=61 so as to satisfy P+1=N, and T (secondary scan distance)=p×d=61d. In this case, the overlapping raster is formed with one linear raster, not two successive linear rasters, although those two linear rasters are employed by the above-mentioned embodiment.

Fourth Recording Method

In the fourth recording method, the secondary scan distance T1 (d+$\alpha$) (d: raster-to-raster distance and $\alpha$: offset), and the secondary scan distance T2=(121d−$\alpha$). Here, 0<$\alpha$≦$\alpha$MAX $$\alpha MAX=\{(a-d)\times\sqrt{2}\}\div\sqrt{2}$$

where a: minimum dot diameter

The feeding distance of each of the following secondary scan feedings is (d+$\alpha$): the secondary scan feeding carried out between the n-th and (n+1)th primary scans, the secondary scan feeding between the (n+2)th and (n+3)th primary scans, and the secondary scan feeding between the (n+4)th and the (n+5)th primary scans. The feeding distance of each of the following secondary feedings is (121d−$\alpha$): the secondary scan feeding carried out between the (n+1)th and (n+2)th primary scans, and the (n+3)th and (n+4)th primary scans. Thus, the secondary scan feedings of the distance (d+$\alpha$) and (121d−$\alpha$) are alternately and repeatedly carried out.

When a (minimum dot diameter) ≈60 $\mu$m, d≈35.3 $\mu$m, and $\alpha$MAX≈7 $\mu$m. Accordingly, the offset $\alpha$ may take a value (e.g., 3 $\mu$m) of a Positive integer smaller than 7 $\mu$m.

If d (secondary scan distance) =(d+$\alpha$), the printing may be performed without producing a white stripe between the adjacent linear rasters. The reason for this follows.

If the paired linear rasters are affected in their formation by the ink flight bending of the nozzle used, the resultant linear rasters are likewise affected in its configuration by the flight bending. Accordingly, a distance "x" between both the linear rasters is reduced to such a level as defined by the result of dividing the minimum dot diameter "a" by $\sqrt{2}$. In other words, even If the minimum dot diameter "a" takes its theoretical value (=x x $\sqrt{2}$) relative to the raster-to-raster (, or dot-to-dot) distance "x", a white stripe does not appear between the linear rasters in the recording, Accordingly, the recording is performed without producing the stripe between the linear rasters if the raster-to-raster distance "x" is defined by $$D<x\leq d+\alpha MAX$$

where $\alpha$MAX: maximum value of the offset $\alpha$ which is added to the raster-to-raster distance.

The raster-to-raster distance may be increased without producing the stripe between the linear rasters. With this feature, even if the dot diameter "a" of an ink drop ejected from the nozzle is relatively small, a width in a picture (line width) in a picture formed by the paired linear rasters may be increased.

The raster-to-raster distance after the sheet is moved by the secondary scan distance 121d is reduced by a. Those linear rasters are formed by a nozzle, which is different from that in the previous case. There is a chance that a stripe will be formed unless the minimum dot diameter = two times as long as the distance "d". However, there is no chance of forming the strip since the secondary scan distance is reduced by $\alpha$.

Thus, the fourth recording method succeeds in suppressing the stripe formation in the paired linear rasters formed by a nozzle and those formed by another nozzle.

A specific value of a is preferably determined, every recording device, by the experiment or the like so that no stripe appears between the paired linear rasters formed before and after the sheet is moved by a secondary scan distance (d+$\alpha$) and between the paired linear rasters formed before and after the sheet is moved by a secondary scan distance (121d−$\alpha$).

Other Embodiments

While k=2 (k: nozzle pitch) in the above-mentioned embodiments, the nozzle pitch "k" may taken another other suitable value, e.g., 6, 8 or the like.

The first to third recording methods, which are executed under control of the control unit, may also be realized by the hardware technique or by using CPU and a software program executed by the CPU.

The bidirectional recording method, which records an image through the forward and backward scanning movements of the recording head, is employed by the first to third recording methods. However, the recording method can form, by using the unidirectional recording method, not the bidirectional one, a picture as the aggregate of unit rasters each consisting of the paired linear rasters, as a matter of course. One and the same dot forming element is used for forming the paired linear rasters (which form one unit raster). Accordingly, even if the ink flight bending to the secondary scanning operation occurs in the formation or the paired linear rasters, the resultant linear rasters are likewise affected in their configuration by the flight bending. For this reason, no stripe pattern will be produced between the paired linear rasters formed if the dot diameter is equal to its theoretical value or so. Accordingly, even when the invention is applied to an ink jet printer using a pigment ink or inks, no stripe will be produced between those paired linear rasters.

As seen from the foregoing description, the present invention thus far described successfully makes inconspicuous the stripe pattern, viz., the phenomenon that the overlapping raster portion is seen standing out of the non-overlapping raster portion. Accordingly, the resultant picture is improved. Additionally, the invention makes inconspicuous the banding resulting from the displacement of the dot forming positions, which is caused by the secondary scan drive.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A recording device comprising:
    a recording head including an array consisting of an N (N=a positive integer) number of dot forming elements, which are arrayed at a fixed spatial interval D in a secondary scanning operation as a recording-medium feeding direction;
    a head drive means for driving dot forming elements;
    a primary scan drive means for reciprocatively moving said recording head relative to a recording medium in a primary scanning operation, which is orthogonal to the secondary scanning operation; and
    a secondary scan drive means for feeding the recording medium relative to said recording head in the secondary scanning operation, wherein said recording head records an image while scanning a surface of the recording medium in primary and secondary scanning operations;
    wherein said secondary scan drive means determines a secondary scan distance of feeding said recording medium by one secondary scan drive so that the dot forming positions of an M (M=positive integer smaller than N/2) number of upstream dot forming elements, which are located in the upstream end of said dot forming element array as viewed in the secondary scanning operation, in a primary scanning operation, are coincident with the dot forming positions of an M number of downstream dot forming elements, which are located at the downstream end of said dot forming element array in a primary scanning operation after a predetermined number of primary scanning operations are performed; and
    wherein said head drive means intermittently drives said upstream and downstream dot forming elements so as to form dots exactly at the dot forming positions on the same primary scan line, viz., without doubly forming the dots at the same dot forming position and the formation of no dot at its forming position, and drives said upstream dot forming elements so as to more frequently form the dots toward the upstream side and drives the downstream dot forming elements to more frequently form the dots toward the downstream side.

2. A recording device according to claim 1, wherein P is mutually prime to "k", and P+M=N, wherein P is a sheet feeding pitch having a value produced by dividing a secondary scan distance by said secondary scan drive means by a dot-to-dot distance "d" in a recording resolution R as viewed in the secondary scanning operation, and "k" is a dot forming element pitch "k" taking a value produced by dividing a spatial interval D among said dot forming elements by said distance "d".

3. A recording device according to claim 1, wherein a sheet feeding pitch P is {2(N−M)−1}, and a dot forming element pitch "k" takes a value produced by dividing a spatial interval D among said dot forming elements by a dot-to-dot distance "d" in a recording resolution R as viewed in the secondary scanning operation, and said "k" is an even number, and said P is mutually prime to said "k",
    said secondary scan drive means alternately and repeatedly causes a first secondary scan such that said recording medium is moved relative to said recording head in the secondary scan direction by the secondary scan distance of said dot-to-do distance "d" in a recording resolution R as viewed in the secondary scanning operation and a second secondary scan such that said recording medium is moved relative to said recording head in the secondary scanning operation by a distance of P d (P: sheet feeding pitch, d: do-to-dot distance in a recording resolution as viewed in the secondary scanning operation), in such a way that before said first secondary scan, said head drive means causes said dot forming element array to form dots on said recording medium, while said primary scan drive means causes said recording head to move in one of the forward and backward primary scanning operations, and
    after said first secondary scan, but before said second secondary scan, said head drive means causes said dot forming element array to form dots on said recording medium, while said primary scan drive means causes said recording head to move in the other of the forward and backward primary scanning operations.

4. A recording head according to claim 3, wherein said primary scan drive means, said secondary scan drive means and said head drive means are arranged such that two linear rasters formed by one and the same dot forming element before and after the sheet feeding of said secondary scan distance "d" are handled as a unit raster, and a linear raster adjacent to said unit raster is formed by a dot forming element which is different from said dot forming element used for forming said unit raster.

5. A recording head according to claim 3, wherein an offset α of the secondary scan distance is larger than zero (0), but smaller than a value obtained in a manner that the product of multiplying said distance "a" by √2 is subtracted from a diameter of a dot formed by said dot forming element, and the result of the subtraction is divided by √2 and said first secondary scan distance is the sum of said distance "d" and said offset α, and said second secondary scan distance is the result of subtracting said offset from said distance (P·d).

6. A recording head according to claim 5, wherein recording data to form dots in the primary scanning operation before said first secondary scan is set or may be set to be the same as recording data to form dots in the primary scanning operation after said first secondary scan.

7. A recording head according to claim 3, wherein said first secondary scan distance is the sum of said distance "d" and an offset α, and said second secondary scan distance is the result of subtracting said offset from said distance (P·d), and said offset α is larger than 0, and takes such a value as not to generate a white stripe pattern between adjacent linear rasters formed before and after the sheet feeding of the secondary scan distance (d+α) and between adjacent linear rasters formed before and after the sheet feeding of the secondary scan distance {(P·d)−α}.

8. A recording head according to claim 3, wherein recording data to form dots in the primary scanning operation before said first secondary scan is set or may be set to be the same as recording data to form dots in the primary scanning operation after said first secondary scan.

9. A recording head according to claim 3, wherein recording data to form dots in the primary scanning operation before said first secondary scan is set or may be set to be the same as recording data to form dots in the primary scanning operation after said first secondary scan.

10. A recording device according to claim 1, wherein a sheet feeding pitch P is {2(N−M)−1}, and a dot forming element pitch "k" takes a value produced by dividing a spatial interval D among said dot forming elements by a dot-to-dot distance "d" in a recording resolution R as viewed in the secondary scanning operation, and said "k" is an even number, and said P is mutually prime to said "k", and said secondary scan drive means alternately and repeatedly causes a first secondary scan such that said recording medium is moved relative to said recording head in the secondary scanning operation by said dot-to-do distance "d" in a recording resolution R as viewed in the secondary scanning operation and a second secondary scan such that said recording medium is moved relative to said recording head in the secondary scanning operation by a distance of P·d (P: sheet feeding pitch, d: do-to-dot distance in a recording resolution as viewed in the secondary scanning operation), in such a way that before said first secondary scan, said head drive means causes said dot forming element array to form dots on said recording medium, while said primary scan drive means causes said recording head to move in the forward or backward primary scanning operation, and after said first secondary scan, but before said second secondary scan, said head drive means causes said dot forming element array to form dots on said recording medium, while said primary scan drive means causes said recording head to move in the forward or backward primary scanning operation.

11. A recording head according to claim 10, wherein said primary scan drive means, said secondary scan drive means and said head drive means are arranged such that two linear rasters formed by one and the same dot forming element before and after the sheet feeding of said secondary scan distance "d" are handled as a unit raster, and a linear raster adjacent to said unit raster is formed by a dot forming element which is different from said dot forming element used for forming said unit raster.

12. A recording head according to claim 10, wherein an offset α of the secondary scan distance is larger than zero (0), but smaller than a value obtained in a manner that the product of multiplying said distance "d" by √2 is subtracted from a diameter of a dot formed by said dot forming element, and the result of the subtraction is divided by √2, and said first secondary scan distance is the sum of said distance "d" and said offset α, and said second secondary scan distance is the result of subtracting said offset from said distance (P·d).

13. A recording head according to claim 12, wherein recording data to form dots in the primary scanning operation before said first secondary scan is set or may be set to be the same as recording data to form dots in the primary scanning operation after said first secondary scan.

14. A recording head according to claim 10, wherein said first secondary scan distance is the sum of said distance "d" and an offset α, and said second secondary scan distance is the result of subtracting said offset from said distance (P·d), and said offset α is larger than 0, and takes such a value as not to generate a white stripe pattern between adjacent linear rasters formed before and after the sheet feeding of the secondary scan distance (d+α) and between adjacent linear rasters formed before and after the sheet feeding of the secondary scan distance {(P·d)−α}.

15. A recording head according to claim 10, wherein recording data to form dots in the primary scanning operation before said first secondary scan is set or may be set to be the same as recording data to form dots in the primary scanning operation after said first secondary scan.

16. A recording device comprising:

a recording head including an array consisting of an N (N=a positive integer) number of dot forming elements, which are arrayed at a fixed spatial interval D in a secondary scanning operation as a recording-medium feeding direction;

a head drive means for driving dot forming elements;

a primary scan drive means for reciprocatively moving said recording head relative to a recording medium in a primary scanning operation, which is orthogonal to the secondary scanning operation; and a secondary scan drive means for feeding a recording medium relative to said recording head in the secondary scanning operation, wherein said recording head records an image while scanning a surface of the recording medium in primary and secondary scanning operations;

wherein said secondary scan drive means determines a secondary scan distance of feeding said recording medium by one secondary scan drive so that the dot forming positions of an M (M=positive integer smaller than N/2) number of upstream dot forming elements, which are located in the upstream end of said dot forming element array as viewed in the secondary scanning operation, in a primary scanning operation, are coincident with the dot forming positions of an M number of downstream dot forming elements, which are located at the downstream end of said dot forming element array in a primary scanning operation after a predetermined number of primary scanning operations are performed; and wherein said head drive means intermittently drives said upstream and downstream dot forming elements so as to form dots exactly at the dot forming positions on the same primary scan line, viz., without doubly forming the dots at the same dot forming position and the formation of no dot at its forming position, and drives said upstream and downstream dot forming elements so as to more frequently form the dots as said upstream and downstream dot forming elements approach to common use dot forming elements other than said upstream and downstream dot forming elements.

17. A recording device according to claim 16, wherein P is mutually prime to "k", and P+M=N, wherein P is a sheet feeding pitch having a value produced by dividing a secondary scan distance by said secondary scan drive means by a dot-to-dot distance "d" in a recording resolution R as viewed in the secondary scanning operation, and "k" is a dot forming element pitch "k" taking a value produced by dividing a spatial interval D among said dot forming elements by said distance "d".

18. A recording device comprising:
   a recording head including an array consisting of an N (N=a positive integer) number of dot forming elements, which are arrayed at a fixed spatial interval D in a secondary scanning operation as a recording-medium feeding direction;
   a head drive means for driving dot forming elements;
   a primary scan drive means for reciprocatively moving said recording head relative to a recording medium in a primary scanning operation, which is orthogonal to the secondary scanning operation; and
   a secondary scan drive means for feeding the recording medium relative to said recording head in the secondary scanning operation, wherein said recording head records an image while scanning a surface of the recording medium in primary and secondary scanning operations;
   wherein said secondary scan drive means determines a secondary scan distance of feeding said recording medium by one secondary scan drive so that the dot forming positions of one upstream end of said dot forming element array as viewed in the secondary scanning operation, in a primary scanning operation, are coincident with the dot forming positions of one downstream dot forming element, which are located at the downstream end of said dot forming element array in a primary scanning operation after a predetermined number of primary scanning operations are performed; and
   wherein said head drive means intermittently drives said upstream and downstream dot forming elements so as to successively form dots in a ratio of 1 to 1 on the same primary scan line, and the number of dots successively formed is selected so as to make inconspicuous the displacement of the dot forming positions for said upstream dot forming element relative to the dot forming positions for said downstream dot forming element, if the displacement is present.

19. A recording device according to claim 18, wherein "k" is an even number, P is mutually prime to "k", and P+1=N, wherein P is a sheet feeding pitch having a value produced by dividing a secondary scan distance by said secondary scan drive means by a dot-to-dot distance "d" in a recording resolution R as viewed in the secondary scanning operation, and "k" is a dot forming element pitch "k" taking a value produced by dividing a spatial interval D among said dot forming elements by said distance "d".

20. A recording device according to claim 18, wherein a sheet feeding pitch P is 2N−3, and a dot forming element pitch "k" takes a value produced by dividing a spatial interval D among said dot forming elements by a dot-to-dot distance "d" in a recording resolution R as viewed in the secondary scanning operation, and said "k" is an even number, and said P is mutually prime to said "k", and
   wherein said secondary scan drive means alternately and repeatedly causes a first secondary scan such that said recording medium is moved relative to said recording head in the secondary scanning operation by the secondary scan distance in a recording resolution R as viewed in the secondary scanning operation and a second secondary scan such that said recording medium is moved relative to said recording head in the secondary scanning operation by the secondary scan distance obtained by multiplying said sheet feeding pitch P by a recording resolution as viewed in the secondary scanning operation, in such a way that before said first secondary scan, said head drive means causes said dot forming element array to form dots on said recording medium, while said primary scan drive means causes said recording head to move in one of the forward and backward primary scanning operations, and
   after said first secondary scan, but before said second secondary scan, said head drive means causes said dot forming element array to form dots on said recording medium, while said primary scan drive means causes said recording head to move in the other of the forward and backward primary scanning operations.

21. A recording head according to claim 20, wherein said primary scan drive means, said secondary scan drive means and said head drive means are arranged such that two linear rasters formed by one and the same dot forming element before and after the sheet feeding of said secondary scan distance "d" are handled as a unit raster, and a linear raster adjacent to said unit raster is formed by a dot forming element which is different from said dot forming element used for forming said unit raster.

22. A recording head according to claim 20, wherein an offset $\alpha$ of the secondary scan distance is larger than zero (0), but smaller than a value obtained in a manner that the product of multiplying said distance "d" by $\sqrt{2}$ is subtracted from a diameter of a dot formed by said dot forming element, and the result of the subtraction is divided by $\sqrt{2}$, and said first secondary scan distance is the sum of said distance "d" and said offset $\alpha$, and said second secondary scan distance is the result of subtracting said offset from said distance (P·d).

23. A recording head according to claim 22, wherein recording data to form dots in the primary scanning operation before said first secondary scan is set or may be set to be the same as recording data to form dots in the primary scanning operation after said first secondary scan.

24. A recording head according to claim 20, wherein said first secondary scan distance is the sum of said distance "d" and an offset $\alpha$, and said second secondary scan distance is the result of subtracting said offset from said distance (P·d), and said offset $\alpha$ is larger than 0, and takes such a value as not to generate a white stripe pattern between adjacent linear rasters formed before and after the sheet feeding of the secondary scan distance (d−60) and between adjacent linear rasters formed before and after the sheet feeding of the secondary scan distance {(P·d)−$\alpha$}.

25. A recording head according to claim 20, wherein recording data to form dots in the primary scanning operation before said first secondary scan is set or may be set to be the same as recording data to form dots in the primary scanning operation after said first secondary scan.

26. A recording device according to claim 18, wherein a sheet feeding pitch P is 2N−3, and a dot forming element pitch "k" takes a value produced by dividing a spatial interval D among said dot forming elements by a dot-to-dot distance "d" in a recording resolution R as viewed in the secondary scanning operation, and said "k" is an even number, and said P is mutually prime to said "k", and
   wherein said secondary scan drive means alternately and repeatedly causes a first secondary scan such that said recording medium is moved relative to said recording head in the secondary scanning operation by the secondary scan distance in a recording resolution R as viewed in the secondary scanning operation and a second secondary scan such that said recording medium is moved relative to said recording head in the secondary scanning operation by the secondary scan distance obtained by multiplying said sheet feeding pitch P by a recording resolution as viewed in the secondary scanning operation in such a way that before said first secondary scan, said head drive means causes said dot forming element array to form dots on said recording medium, while said primary scan drive means causes said recording head to move in the forward or backward primary scanning operation, and after said first secondary scan, but before said second secondary scan, said head drive means causes said dot forming element array to form dots on said recording medium, while said primary scan drive means causes said recording head to move in the forward or backward primary scanning operation.

27. A recording head according to claim 26, wherein said primary scan drive means, said secondary scan drive means and said head drive means are arranged such that two linear rasters formed by one and the same dot forming element before and after the sheet feeding of said secondary scan distance "d" are handled as a unit raster, and a linear raster adjacent to said unit raster is formed by a dot forming element which is different from said dot forming element used for forming said unit raster.

28. A recording head according to claim 26, wherein an offset α of the secondary scan distance is larger than zero (0), but smaller than a value obtained in a manner that the product of multiplying said distance "d" by $\sqrt{2}$ is subtracted from a diameter of a dot formed by said dot forming element, and the result of the subtraction is divided by $\sqrt{2}$, and said first secondary scan distance is the sum of said distance "d" and said offset α, and said second secondary scan distance is the result of subtracting said offset from said distance (P·d).

29. A recording head according to claim 28, wherein recording data to form dots in the primary scanning operation before said first secondary scan is set or may be set to be the same as recording data to form dots in the primary scanning operation after said first secondary scan.

30. A recording head according to claim 26, wherein said first secondary scan distance is the sum of said distance "d" and an offset α, and said second secondary scan distance is the result of subtracting said offset from said distance (P·d), and said offset α is larger than 0, and takes such a value as not to generate a white stripe pattern between adjacent linear rasters formed before and after the sheet feeding of the secondary scan distance (d+α) and between adjacent linear rasters formed before and after the sheet feeding of the secondary scan distance {(P·d)−α}.

31. A recording head according to claim 26, wherein recording data to form dots in the primary scanning operation before said first secondary scan is set or may be set to be the same as recording data to form dots in the primary scanning operation after said first secondary scan.

* * * * *

UNITED STATES PATENT AND TRADEMARK OFFICE
CERTIFICATE OF CORRECTION

PATENT NO. : 6,435,656 B2
DATED : August 20, 2002
INVENTOR(S) : Fujioka

It is certified that error appears in the above-identified patent and that said Letters Patent is hereby corrected as shown below:

<u>Title page,</u>
Item [30], Foreign Application Priority Data, should read:
-- [30]      Foreign Application Priority Data
        Jul. 27, 2000    (JP) ............................... 2000-226277
        Jul. 23, 2001    (JP) ............................... 2001-220944 --

Signed and Sealed this

Twenty-sixth Day of August, 2003

JAMES E. ROGAN
*Director of the United States Patent and Trademark Office*